United States Patent [19]
Nishimura et al.

[11] 3,962,619
[45] June 8, 1976

[54] FEED CONTROL DEVICE

[75] Inventors: Hideo Nishimura, Kariya; Tamotsu Ishigaki, Chiryu, both of Japan

[73] Assignee: Toyoda Koki Kabushiki Kaisha, Japan

[22] Filed: Oct. 9, 1974

[21] Appl. No.: 513,383

[30] Foreign Application Priority Data
Dec. 11, 1973 Japan.............................. 48-138420

[52] U.S. Cl.................................. 318/571; 318/39
[51] Int. Cl.²......................................... G05B 19/24
[58] Field of Search.............................. 318/39, 571

[56] References Cited
UNITED STATES PATENTS

| | | | |
|---|---|---|---|
| 3,099,780 | 7/1963 | Morgan............................... | 318/571 |
| 3,191,205 | 6/1965 | Gilbert............................ | 318/571 X |
| 3,418,547 | 12/1968 | Dudler............................. | 318/571 X |
| 3,665,493 | 5/1972 | Glowzewski et al............. | 318/571 X |
| 3,698,268 | 10/1972 | Cutler............................. | 318/571 X |
| 3,720,120 | 3/1973 | Cutler............................. | 318/571 X |
| 3,720,135 | 3/1973 | Merner et al.................... | 318/571 X |

*Primary Examiner*—B. Dobeck
*Attorney, Agent, or Firm*—Oblon, Fisher, Spivak, McClelland & Maier

[57] ABSTRACT

A feed control device is disclosed for controlling the feed speed of a tool relative to a workpiece to be machined. The device includes a load detector for generating an output signal in response to a load applied to the tool, a circuit responsive to the output signal generated by the load detector when the load is higher than a predetermined value for successively decreasing the feed speed until the load reaches the predetermined value, and a circuit responsive to the output signal generated by the load detector when the load is not more than the predetermined value for successively increasing the feed speed until the feed speed reaches a predetermined value.

5 Claims, 3 Drawing Figures

FEED CONTROL DEVICE

BACKGROUND OF THE INVENTION

1. Field of the Invention

The present invention relates to a feed control device for controlling the relative speed of a tool and a workpiece in accordance with variation in loads.

2. Description of the Prior Art

The feed speed of a tool relative to a workpiece is generally determined in accordance with cutting conditions such as the material in use, the shape of the workpiece and the desired machining accuracy. However, even if the feed speed is initially set properly, the setting of the feed speed does not always remain proper since the cutting ability of the tool may decrease as the cutting operation on the workpiece proceeds when the shape, or surface roughness and hardness of the workpiece are not uniform. Particularly, problems arise when the workpiece is complicated in shape and is to be operated on non-continuously. Thus, defects and tool damage may occur because of great variations in load torque applied on the tool during the machining operation, lowering the machining accuracy and creating non-uniformity in finished workpieces.

SUMMARY OF THE INVENTION

It is therefore one object of the present invention to provide a new and improved feed control device for controlling the feed speed of a tool relative to a workpiece whereby machining accuracy of the workpiece can be prevented from being lowered, machining accuracy of the all finished workpieces can be maintained uniform and tool damage and faulty machining of the workpiece can be prevented.

Another object of the present invention is to provide a new and improved feed control device for controlling the feed speed of a tool relative to a workpiece wherein, when the load applied to the tool is higher than a predetermined value, the feed speed is successively decreased until the load reaches a predetermined value, and wherein when the load is not more than the predetermined value, the feed speed is successively increased until the feed speed reaches the predetermined value.

Briefly, these and other objects of the invention are achieved in accordance with the present invention by the provision of a circuit which measures the load on a machining tool and generates a corresponding output signal. A control circuit is also provided for setting an initial feed speed. If the initial feed speed generates a load which is above a predetermined value, circuity including a voltage-to-frequency converter, is provided to reduce the feed speed. Similarly, if the load is below a predetermined value, circuity is provided to increase the feed speed.

BRIEF DESCRIPTION OF THE DRAWINGS

The foregoing and other objects of the present invention will be more fully appreciated as the same becomes better understood from the following detailed description of the preferred embodiments, when considered in connection with the accompanying drawings in which.

DETAILED DESCRIPTION OF THE PREFERRED EMBODIMENTS

Figure 1:
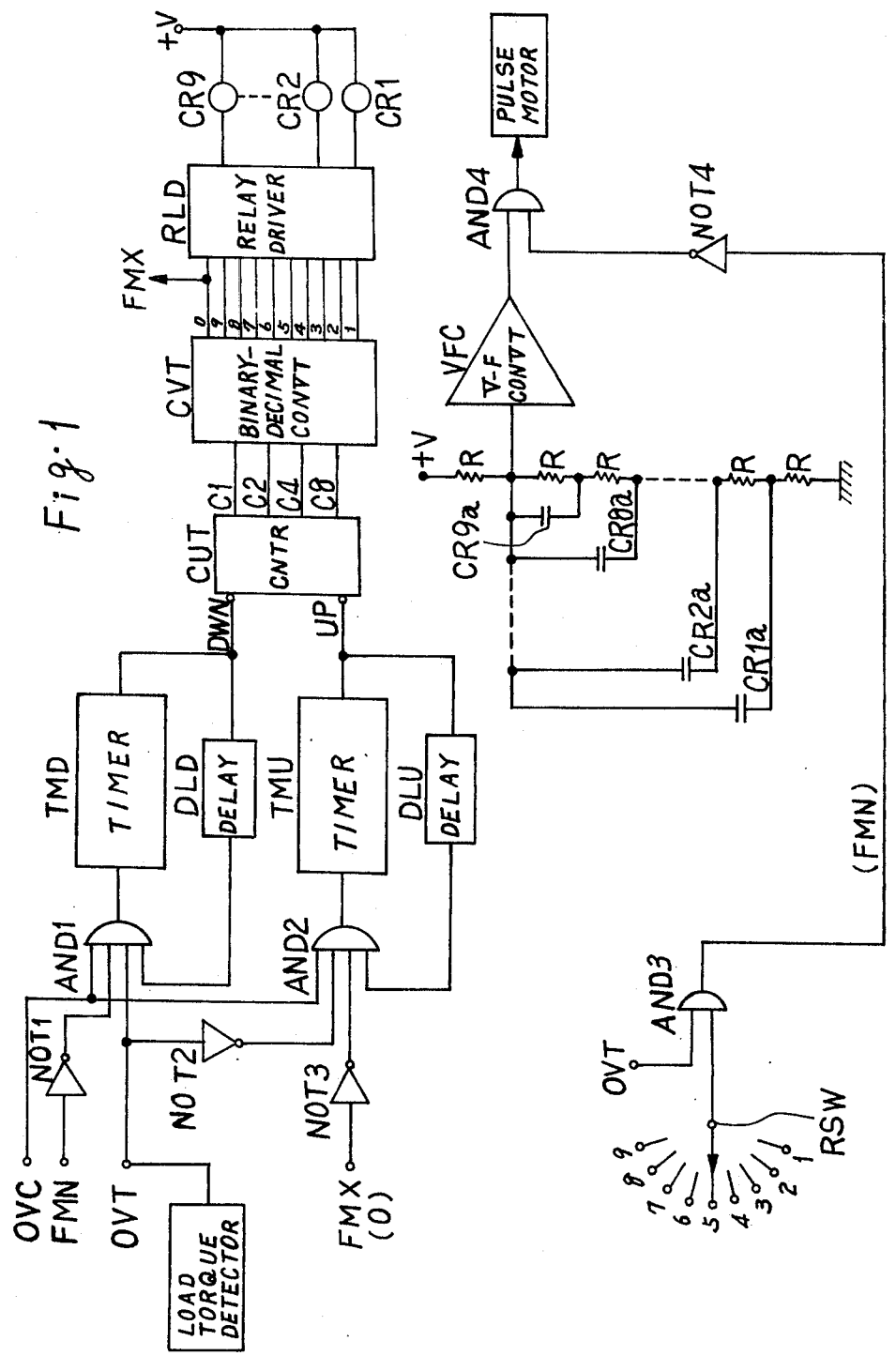
FIG. 1 is a schematic and block diagram of a first embodiment of the present invention.

Referring now to the drawings, wherein like reference characters refer to identical or corresponding parts throughout the views, there is shown in FIG. 1 a reversible counter CUT, one input terminal DWN of which is connected to a timer TMD for generating a train of pulses for subtraction. Connected to the input terminal of the timer TMD is a 4-input AND circuit AND 1 having its input terminals connected respectively to a terminal OVC for receiving a ONE output signal when the feed speed of a tool relative to a workpiece to be machined is to be controlled in response to load torque exerted on the tool during a machining operation, to a terminal FMN for receiving a ONE output signal when the feed speed is lowered below a predetermined lower limit through an inverter NOT 1, to a terminal OVT for receiving a ONE output signal from a conventional load torque detector LTD when the load torque exceeds a predetermined value, and to an output terminal of a delay circuit DLD whose input terminal is connected to the output terminal of the timer TMD. The other input terminal UP of the reversible counter CUT is connected to a timer TMU for generating a train of pulses for addition. Connected to the input terminal of the timer TMU is a 4-input AND circuit AND 2, having its input terminals connected respectively to the terminal OVC, to the terminal OVT through an inverter NOT 2, to a terminal FMX for receiving a ONE output signal when the feed speed reaches a predetermined upper limit through an inverter NOT 3 and to an output terminal of a delay circuit DLU whose input terminal is connected to the output terminal of the timer TMU.

Output terminals C1, C2, C4 and C8 of the reversible counter CUT, which respectively correspond to numerical values 1, 2, 4 and 8, are connected to a relay driver RLD through a binary-decimal converter CVT.

An external output circuit will now be described. Relays CR1 to CR9 connected to the relay driver RLD are respectively energized by outputs 1 to 9 from the binary-to-decimal converter CVT, which respectively correspond to numerical values 1 to 9. Normally open contacts CR1a to CR9a of respective relays CR1 to CR9 are respectively connected to resistances R for adjusting an input voltage of a voltage-frequency converter VFC which generates a train of pulses with frequency corresponding to the input voltage. Thus, the input voltage of the V-F converter VFC is set by the closing of one of the contacts CR9a to CR1a to an arbitrary voltage, which is lower than a predetermined upper limit voltage +V corresponding to a predetermined upper limit feed speed, such, in the present embodiment, as a voltage lower than the predetermined voltage +V by 10 percent for each resistance R. Fixed contacts of a rotary switch RSW for setting a lower limit feed speed are connected to receive the respective outputs 1 to 9 from the binary-decimal converter CVT. A contact finger of the rotary switch RSW and the terminal OVT are connected to input terminals of a 2-input AND circuit, AND 3, whose output terminal is connected to one input terminal of a 2-input AND circuit, AND 4, through an inverter NOT 4 and to the terminal FMN. The other input terminal of the AND circuit AND 4 is connected to the output terminal of the V-F converter. The output terminal of the AND circuit AND 4 is connected to a pulse motor for feed movement. The output terminal 0 of the binary-decimal converter CVT is connected to the terminal FMX.

Figure 2:
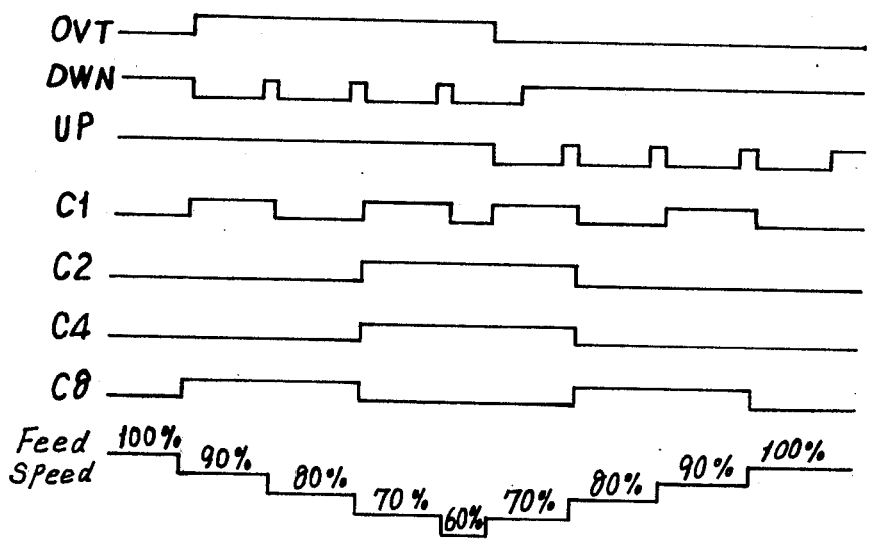
FIG. 2 is an operational diagram of the first embodiment of the invention showing various signal levels as a function of time; and, FIG. 3 is a block diagram of a second embodiment of the present invention.

The operation of the present invention will now be described with reference to FIG. 2. At first, the voltage of the V-F converter VFC is set to the voltage +V for generating a train of pulses with a frequency suitable to rotate the pulse motor at the number of rotations corresponding to the feed speed necessary to operate a workpiece at specified cutting conditions.

The contact finger of the rotary switch RSW is connected to the fixed contact 5 so that the feed speed is not lowered to a value which is 50 percent less than that determined by the predetermined voltage +V of the V-F converter VFC. A ONE output signal is sent to the terminal OVC so that the feed speed is to be controlled in response to the load torque applied on the tool.

Under these conditions, the feed control device shown in FIG. 1 is operated. When no load torque is applied on the tool or when the load torque applied on the tool is less than a predetermined load torque, the output signal from the load torque detector is in the ZERO state so that the output of the AND circuit AND 1 is in the ZERO state. Under the condition where the reversible counter CUT receives no input pulse, a ONE output signal appears at the output terminal 0 of the binary-decimal converter CVT so that the terminal FMX receives a ONE output signal thereby feeding a ZERO output signal to the AND circuit AND 2 through the inverter NOT 3. Thus, the relays CR1 to CR9 connected to the relay driver RLD are not energized so that a train of pulses with frequency corresponding to the predetermined voltage +V is generated from the V-F converter VFC. A ZERO output signal appears at the terminal OVT and at the fixed contact 5 of the rotary switch RSW so that the AND circuit AND 4 receives a ONE output signal through the AND circuit AND 3 and the inverter NOT 4. Consequently, a train of pulses with frequency corresponding to the predetermined voltage +V is fed to the pulse motor so that the workpiece or the tool is fed at the predetermined feed speed in accordance with the cutting condition (100 percent feed speed in FIG. 2).

When the load torque applied on the tool is increased so that a ONE output signal appears at the terminal OVT, all of the inputs of the AND circuit AND 1 become ONEs to thereby set the timer TMD, whereby the output state of the timer TMD is changed from ONE to ZERO. The numerical value in the reversible counter CUT is therefore decreased from 0 to 9 so that a ONE output signal appears at the output terminals C1 and C8 of the reversible counter CUT and at the output terminal 9 of the binary-decimal converter CVT. The relay CR9 is in turn energized to close the contact CR9a thereof so that the input voltage of the V-F converter VFC is decreased by 10 percent relative to the predetermined voltage +V, and as a result the frequency of the pulses from the V-F converter VFC is also decreased by 10 percent. Under these conditions, the terminal OVT receives a ONE output signal but the fixed contact 5 receives a ZERO output signal so that the output from the inverter NOT 4 remains unchanged in the ONE state. Therefore, the number of rotations of the pulse motor is decreased by 10 percent in response to a decrease in pulse frequency so that the feed speed of the workpiece or the tool is also decreased by 10 percent.

If the load torque is still not less than the predetermined value, even if the load torque applied on the tool is decreases by the 10 percent decrease in the feed speed, the output signal at the terminal OVT still remains in the ONE state. Therefore, with a predetermined time period lapsing after a ONE output signal is generated at the output terminal of the timer TMD because the timer TMD is timed out, the output state of the delay circuit DLD is again changed from ZERO to ONE so that the TMD is again set to change the output state thereof from ONE to ZERO. Consequently, similar to the above-mentioned operation, the numerical value in the reversible counter CUT is again decreased from 9 to 8 so that a ONE output signal appears at the output terminal C8 of the reversible counter CUT and at the output terminal 8 of the binary-decimal converter CVT. The relay CR8 is in turn energized to close the contact CR8a thereof so that the input voltage of the V-F converter VFC is decreased by 20 percent of the predetermined voltage +V. As a result, the frequency of the pulses from the V-F converter VFC is also decreased by 20 percent. Under these conditions, since the output of the fixed contact 5 is in the ZERO state, the output of the inverter NOT 4 remains unchanged in the ONE state. Therefore, the number of rotations of the pulse motor is decreased in response to a decrease in the pulse frequency so that the feed speed of the workpiece or the tool is also decreased by 20 percent of the predetermined feed speed corresponding to the predetermined voltage +V of the V-F converter VFC.

In this manner, even if the feed speed is successively decreased, if the load torque applied to the tool does not become less than the predetermined value, the feed speed is decreased more in the small manner as described above. If the load torque applied on the tool becomes less than the predetermined value at the time the feed speed reaches 60 percent of the predetermined value, the output signal at the terminal OVT is changed from the ONE state to the ZERO state (see 60 percent feed speed in FIG. 2). Consequently, the output of the AND circuit AND 1 is changed to the ZERO state and at the same time the output from the inverter NOT 2 is changed to the ONE state. Since the ONE output signals appear at terminal OVC; at the output terminal of the inverter NOT 3 (because the ZERO output signal appears at the output terminal 0 of the binary-decimal converter CVT, that is, at the terminal FMX) and at the output terminal of the delayed circuit DLU, the output of the AND circuit AND 2 is changed to the ONE state. The timer TMU is thus set to change its output from the ONE state to the ZERO state so that the numerical value of the reversible counter CUT is increased from 6 to 7. A ONE output signal appears at the output terminals C1, C2 and C4 of the reversible counter CUT and at the output terminal 7 of the binary-decimal converter CVT. Thus, the relay CR6 is deenergized to open the contact CR6a thereof and the relay CR7 is energized to close the contact CR7a thereof so that the input voltage of the V-F converter VFC is increased from 60 to 70 percent of the predetermined voltage +V. As a result, the frequency of the pulses from the V-F converter VFC is also increased. Under these conditions, since the outputs at the terminal OVT and at the fixed contact 5 are in the ZERO state, the output of the inverter NOT 4 remains unchanged in the ONE state. Therefore, the number of rotations of the pulse motor is increased in response to an increase in the pulse frequency from the V-F converter VFC so that the feed speed of the workpiece or the tool is also increased from 60 to 70 percent of the predetermined feed speed.

If the load torque is still less than the predetermined value, even if the load torque applied on the tool is increased by the increase in the feed speed, the output signal at the terminal OVT still remains in the ZERO state. Therefore, with a predetermined time period lapsing after a ONE output signal is generated at the output terminal of the time TMU when it is timed out, the output of the dealy circuit DLU is again changed from the ZERO state to the ONE state so that the timer TMU is again set to change the output thereof from the ONE state to the ZERO state. Consequently, similar to the above-mentioned operation, the numerical value in the reversible counter CUT is again increased from 7 to 8 so that a ONE output signal appears at the output terminal C8 of the reversible counter CUT and at the output terminal 8 of the binary-decimal converter CVT. The relay CR7 is deenergized to open the contact CR7a thereof and the relay CR8 is energized to close the contact CR8a thereof so that the input voltage of the V-F converter VFC is increased from 70 to 80 percent of the predetermined voltage +V. As a result the frequency of the pulses from the V-F converter VFC is also increased. Under these conditions, similar to the above described operation, since the output of the inverter NOT 4 is in the ONE state, the number of rotations of the pulse motor is increased in response to the increase in the pulse frequency from the V-F converter VFC so that the feed speed of the workpiece or the tool is increased from 70 to 80 percent of the predetermined feed speed.

In this manner, even if the feed speed is successively increased, if the load torque applied on the tool is less than the predetermined value, the feed speed is again increased in the same manner as described above. When the feed speed returns to the predetermined feed speed corresponding to the predetermined voltage +V of the V-F converter VFC, the numerical value in the reversible counter CUT becomes 10 so that the output at the output terminal 0 of the binary-decimal converter CVT is a ONE. The terminal FMX receives a ONE output signal so that the output of the inverter NOT 3 is changed from the ONE state to the ZERO state. Under these conditions, even if the load torque applied to the tool is less than the predetermined value and thus the output of the inverter NOT 2 is in the ONE state, the timer TMU is not set so that the feed speed of the workpiece or the tool is kept at the predetermined feed speed. On the other hand, if the load torque applied on the tool exceeds the predetermined value, the feed speed is again decreased by the above-mentioned operation so that the feed speed is always at an optimum value in response to the load conditions.

When the load torque applied on the tool exceeds the predetermined value, even if the feed speed is decreased to 50 percent of the predetermined feed speed, a ONE output signal appears at the output terminal 5 of the binary-decimal converter CVT to thereby transmit the ONE output signal to the fixed contact 5. Since the ONE output signal appears at the terminal OVT, the AND circuit AND 3 generates a ONE output signal to change the output of the inverter NOT 4 from the ONE state to the ZERO state 40 thereby stop the pulse motor. Since the inverter NOT 1 generates a ZERO output signal because of the terminal FMN receiving a ONE output signal, the timer TMC is not set even if the terminal OVT receives a ONE output signal, so that the control operation of the control device is stopped. Therefore, tool damage and faulty machining of workpiece because of an abnormal increase in load torque can be prevented from occurring.

Figure 3:
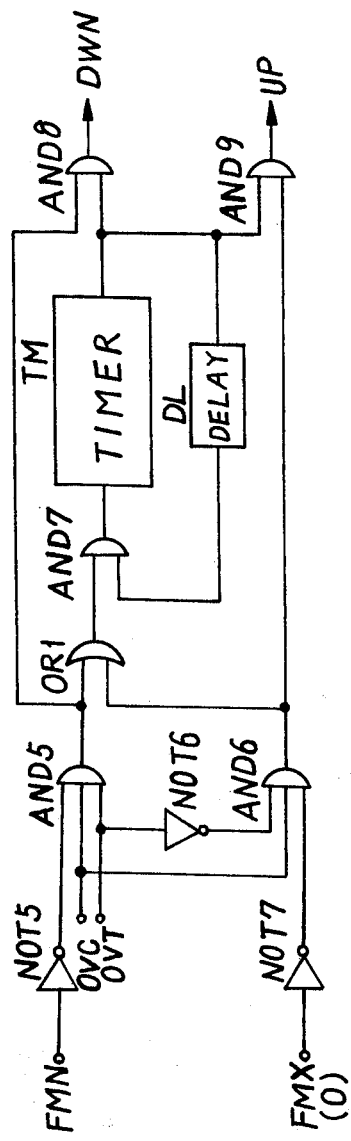

FIG. 3 shows an electrical circuit diagram of a second embodiment of the present invention wherein only an input circuit of the reversible counter CUT is shown and the other circuits are similar to those of FIG. 1. In this second embodiment when the terminal OVT receives a ONE output signal under the conditions where the feed speed does not reach the lower limit set by the rotary switch (50 percent of the predetermined feed speed in this embodiment), an AND circuit, AND 5, generates a ONE output signal, since the input terminals thereof receive a ONE output signal from the terminal FMN through an inverter NOT 5 and a ONE output signal from the terminal OVC. The ONE signal of the AND circuit AND 5 is transmitted through an OR circuit OR 1 to an AND circuit AND 7 which also receives ONE output signal from a delay circuit DL so that a timer TM is set. Input terminals of an AND circuit AND 8 receive ONE output signals from the output terminals of the AND circuit AND 5 and the timer TM so that the change in the output of the timer TM is transmitted to the terminal DWN for subtraction in the reversible counter CUT. Under these conditions, since an AND circuit AND 6 receives a ZERO output signal from an inverter NOT 6 because of the terminal OVT receiving a ONE output signal, AND circuit AND 9 generates a ZERO output signal so that no pulsed are fed to the reversible counter CUT for addition.

When the terminal OVT receives a ZERO output signal under the conditions where the feed speed is lower than the predetermined value, but higher than the lower limit set by the rotary switch RSW, the AND circuit AND 5 generates a ZERO output signal because the terminal OVT receives a ZERO output signal so that the AND circuit AND 8 generates a ZERO output signal regardless of the output from the timer TM. Thus, no pulses are fed to the reversible counter CUT for subtraction. On the other hand, the AND circuit AND 6 generates a ONE output signal, since the input terminals thereof receive ONE output signals from the terminal OVT through the inverter NOT 6, from the terminal OVC and from the terminal FMX through inverter NOT 7. The ONE output signal of the AND circuit AND 6 is transmitted through the OR circuit OR 1 to the AND circuit AND 7 which also receives a ONE output signal from the delay circuit DL so that the timer TM is set. Input terminal and the AND circuit AND 9 receives ONE output signals from the output terminals of the AND circuit AND 6 and the timer TM so that the change in the output of the timer TM is transmitted to the terminal UP for addition in the reversible counter CUT.

Consequently, the present embodiment is not different in operation and effect from the first embodiment except that the input circuit of the reversible counter CUT is simplified in the present embodiment.

Obviously, numerous modifications and variations of the present invention are possible in light of the above teaching. It is therefore to be understood that with the scope of the appended claims the invention may be practiced otherwise than as specifically described herein.

What is claimed as new and desired to be secured by letters patent of the United States is:

1. A feed control device for controlling the feed speed of a tool relative to a workpiece to be machined comprising:

a feed motor for moving said tool relative to said workpiece;

a load detector for generating an output signal in response to a load applied to said tool;

a delay circuit;

an AND circuit for receiving said output signal from said load detector and an output signal from said delay circuit;

a timer for receiving an output signal from said AND circuit, said delay circuit receiving an output signal from said timer;

a plurality of relays;

means responsive to said timer to selectively energize said plurality of relays to change an input voltage; and a voltage-to-frequency converter for receiving said input voltage responsive to energization of said relays to thereby rotate said feed motor.

2. A feed control device for controlling the feed speed of a tool relative to a workpiece to be machined comprising:

a feed motor for moving said tool relative to said workpiece;

a load detector for generating an output signal in response to a load applied to said tool;

a first delay circuit;

a first AND circuit for receiving said output signal from said load detector and an output signal from said first delay circuit;

a first timer for receiving an output signal from said AND circuit, said first delay circuit receiving an output signal from said first timer;

a second delay circuit;

a second AND circuit having an inverter coupled thereto for receiving said output signal from said load detector through said inverter and an output signal from said second delay circuit;

a second timer for receiving an output signal from said second AND circuit, said second delay circuit receiving an output signal from said second timer;

a plurality of relays;

means responsive to said first and second timers to selectively energize said plurality of relays to change an input voltage; and a voltage-frequency converter for receiving said input voltage responsive to energization of said relays to thereby rotate said feed motor whereby when said load is higher than a predetermined value, said feed speed is successively decreased until said load reaches said predetermined value and whereby when said load is less than said predetermined value said feed speed is successively increased until said feed speed reaches a predetermined value.

3. A feed control device according to claim 2, wherein said means responsive to said first and second timers comprises:

a reversible counter.

4. A feed control device for controlling the feed speed of a tool relative to a workpiece to be machined comprising:

a feed motor for moving said tool relative to said workpiece;

a load detector for generating an output signal in response to a load applied to said tool;

an inverter and a delay circuit;

an OR circuit for receiving said output signal from said load detector directly and through said inverter;

a first AND circuit for receiving output signals from said OR circuit and from said delay circuit;

a timer for receiving an output signal from said first AND circuit, said delay circuit receiving an output signal from said timer;

a second AND circuit for receiving said output signals from said load detector and from said timer;

a third AND circuit for receiving said output signals from said load detector through said inverter and from said timer;

a plurality of relays;

means responsive to said second and third AND circuits to selectively energize said plurality of relays to change an input voltage; and a voltage-frequency converter for receiving said input voltage responsive to energization of said relays to thereby rotate said feed motor whereby when said load is higher than a predetermined value, said feed speed is successively decreased until said load reaches said predetermined value and whereby when said load is less than said predetermined value, said feed speed is successively increased until said feed speed reaches a predetermined value.

5. A feed control device according to claim 4, wherein said means responsive to said second and third AND circuits comprises:

a reversible counter.

* * * * *